United States Patent [15] 3,706,648
Hebert et al. [45] Dec. 19, 1972

[54] REGENERATION OF SPENT ALKYLATION ACID

[72] Inventors: Hugh P. Hebert, Trenton; Arnold H. Pelofsky, E. Brunswick, both of N.J.

[73] Assignee: Cities Service Oil Company, Tulsa, Okla.

[22] Filed: Oct. 28, 1970

[21] Appl. No.: 84,683

[52] U.S. Cl. ........204/162 S, 204/163 S, 260/683.62
[51] Int. Cl. ..............................B01j 1/10, B07c 3/24
[58] Field of Search.......................204/163 SA, 163 S, 162 R, 162 S; 260/683.62

[56] References Cited

UNITED STATES PATENTS

| | | | |
|---|---|---|---|
| 3,451,909 | 6/1969 | Chloupek et al. | 204/162 R |
| 2,800,444 | 7/1957 | Hughes et al. | 204/162 S |
| 3,592,871 | 7/1971 | Jones | 260/683.62 |
| 3,592,872 | 7/1971 | Jones | 260/683.62 |
| 3,579,603 | 5/1971 | Jones | 260/683.62 |
| 3,544,652 | 12/1970 | Van Dijk | 260/683.62 |
| 3,591,523 | 7/1971 | Goldsby | 260/683.62 |

*Primary Examiner*—Carl D. Quarforth
*Assistant Examiner*—Roger S. Gaither
*Attorney*—J. Richard Geaman

[57] ABSTRACT

Disclosed in a process by which consumption of sulfuric acid alkylation catalyst is decreased and alkylate yield is increased by reacting the hydrocarbon contaminants contained within spent alkylation acid with an isoparaffin to yield alkylate and sulfuric acid. Ultrasonic energy is utilized to obtain intense mixing to promote the reaction of the contaminats with the isoparaffin in the acid phase. The resulting dispersion is more stable that emulsions obtained from mechanical mixing and affords a high surface area between the hydrocarbon and acid phases for increased alkylate formation and acid regeneration.

2 Claims, 1 Drawing Figure

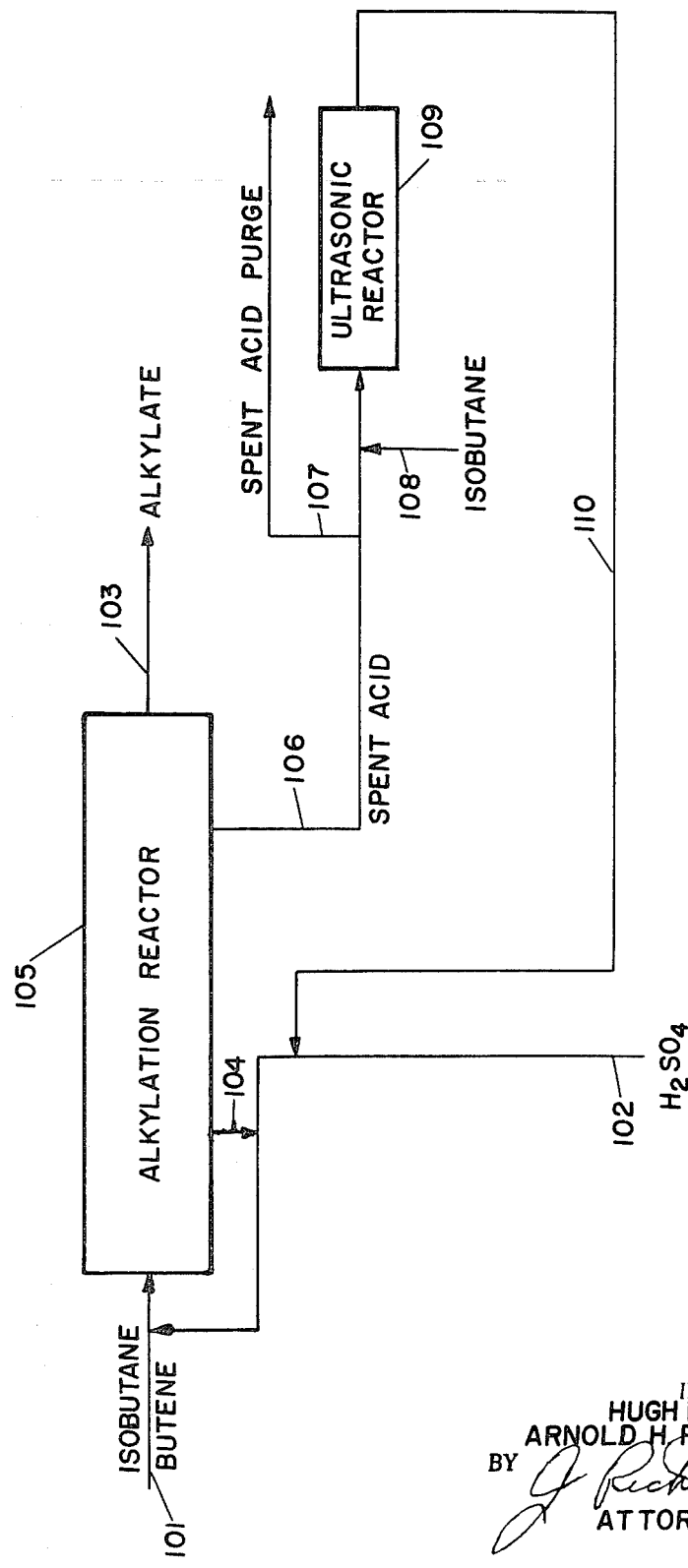

REGENERATION OF SPENT ALKYLATION ACID

BACKGROUND OF THE INVENTION

The present invention relates to a process for the regeneration of spent alkylation acid. More particularly, the process of the present invention is a method for the regeneration of spent sulfuric acid alkylation catalyst by the use of ultrasonic energy to promote the formation of alkylates from organic contaminants in the spent acid.

Alkylation is a process by which the union of an olefin and aromatic or paraffinic hydrocarbon is obtained. Alkylation of isoparaffins and olefins is theoretically preferable to polymerization as a means of utilizing cracking still gases, in that only one molecule of valuable olefin is consumed, rather than two as in polymerization, to produce the molecule of gasoline. It has generally been found that the alkylation process is somewhat more expensive than the formation of polymer gasoline, however, alkylation does provide higher octane number motor gasoline. The most common form of alkylation is that utilizing sulfuric acid as the catalyst. Sulfuric acid has been widely used as a catalyst in most commercial installations due to its relative accessibility and easy handling.

In most sulfuric acid alkylation processes, recirculation of the isoparaffin feed is maintained and the olefins are fed into the recycling stream, often at several points. Thus, the concentration of olefin is always low and the polymerization reactions are minimized. Isobutane and butenes are the most commonly used feed materials. The alkylation reaction is usually operated at pressures from about 5 to about 70 psi and temperatures from about 30°F. to about 100°F.

In sulfuric acid alkylation processes, absorption of the olefinic hydrocarbons by acid occurs at a rate several hundred times as fast as the absorption of the isoparaffins and hence, in order to maintain the proper concentration of the two hydrocarbons in the acid, it is necessary to recycle a large excess of saturated hydrocarbons through the system. The higher the ratio of isoparaffin to olefin in the feedstock, the greater the yield, the higher the octane number and the smaller the acid consumption. Therefore, this ratio is usually held at 5 to 1 or even 10 to 1 in producing the very highest octane number alkylate. Contact times of about 5 minutes appear to be satisfactory, but commercial plants often operate at 20 to 40 minutes. Acid of 98% by weight strength is used, but it becomes diluted during the processing to about 90 percent by weight. This dilution is by the absorption of unreacted hydrocarbons and certain oxidation products. Thus the spent acid which is continuously removed from the process is not destroyed chemically, but is contaminated by organic materials which reduce its performance. Although the spent acid can be further used to treat some refinery stocks such as kerosene and lubricating oils, it is economically desirable to minimize the rate of acid consumption. In addition to the cost of the acid involved, the purging of hydrocarbon contaminants from spend acid represents a hydrocarbon yield loss. What is required is a process for the regeneration of spend alkylation acid so as to decrease acid consumption and increase alkylate yield by converting the hydrocarbon contaminants in the spent alkylation acid into a desirable product.

It is an object of the present invention to provide a process for the regeneration of spent alkylation acid.

It is a further object of the present invention to provide a process by which spent alkylation acid contaminants may be reacted with an isoparaffin to yield alkylate and sulfuric acid.

It is still a further object of the present invention to utilize ultrasonic energy to intense mixing to promote the reaction of isoparaffin with contaminants contained within the spent alkylation acid so as to regenerate the spent alkylation acid by increasing the mass transfer of the isoparaffin into the acid phase to simultaneously alkylate and concentrate the alkylation acid.

With these and other objects in mind, the present invention will be more fully understood by particular reference to the following drawing and description.

SUMMARY OF THE INVENTION

The objects of the present invention are accomplished by an improved process for the regeneration of spent alkylation acid, the alkylation catalyst, which comprises introducing isoparaffin into the spent alkylation acid exiting from the alkylation reaction zone and subjecting the resulting acid phase to ultrasonic energy to convert organic contaminants to alkylate and thereby regenerate the alkylation acid.

Ultrasonic energy is generally supplied at a frequency of about 10 to about 100 kilocycles per second (Kcps) and at an intensity of from about 10 to about 800 watts per square inch (W/in$^2$). In general, the alkylation acid will comprise sulfuric acid, the isoparaffin will be isobutane or isopentane and the olefin either propene or butene or pentene. The reaction residence time of the isoparaffin and spent alkylation acid in the reaction zone is preferred from about 10 seconds to 10 minutes, depending upon the reactor size and flow rates therein. The further addition of fresh alkylation acid to the regenerated alkylation acids is required to make up for that consumed and that purged from the process.

BRIEF DESCRIPTION OF THE DRAWING

The present invention may be more fully understood by referral to the following drawing which represents a sulfuric acid alkylation process with regeneration of spent acid in accordance with the present invention.

DETAILED DESCRIPTION OF THE INVENTION

In the alkylation of isoparaffins and olefins the catalyst, the alkylation acid, which is generally sulfuric acid, becomes contaminated with organic components that reduce the performance of the catalyst. Although the organic contaminants represent only about 3 to 8 percent by weight of the spent acid, a large amount of acid must be discarded in order to remove the contaminants from the system. The present invention utilizes a process in which acid consumption is decreased and alkylate yield is increased by reacting the hydrocarbon contaminants and spent alkylation acid with an isoparaffin, for example isobutane, to yield alkylate and regenerated sulfuric acid. Ultrasonic energy is applied to obtain intense mixing and to promote the reaction by increasing the mass transfer of isobutane into the acid phase.

It has been suggested that if long retention times of organic contaminated alkylation acid are maintained with isobutane, the acid may be regenerated. In a commercial alkylation process, however, there would be an economic penalty in increasing the acid retention time in that the reaction vessel would get excessively large. The reaction rates may be slowed to a rate whereby all the organic contaminants react to alkylates, but again an excessive retention time is required. The process of the present invention, however, does not require larger reactors than are presently utilized and may be utilized with any existing alkylation unit.

The accompanying drawing represents in schematic form an alkylation process in which a mixture of isobutane and butenes is introduced through line 101 into an alkylation reactor 105. In the reactor 105, the isobutane and butene feed is contacted with sulfuric acid alkylation catalyst in a conventional manner to produce alkylate product removed through line 103, spent acid removed through line 106 and a recycle stream of unreacted isobutane and butenes removed from the reactor through line 104. Fresh sulfuric acid catalyst is introduced through line 102 and introduced into the reactor through line 101 along with the fresh feed and recycled reactants. A portion of the spent acid in line 106 is withdrawn through line 107 as spent acid purge. The remaining spent acid is mixed with isobutane introduced through line 108 and passed to ultrasonic reactor 109 in which the mixture of spent acid and isobutane is subjected to ultrasonic energy to regenerate the acid. Regenerated acid is then recycled to the process from reactor 109 through line 110 and lines 102 and 101.

The ultrasonic energy source may be provided by a probe that irradiates the mixture thereby supplying intense mixing energy to satisfactorily emulsify the isoparaffin in the acid phase. Generally, the ultrasonic energy is supplied in about a 10 to about 100 Kcps frequency range with an intensity of about 10 to about 800 W/in$^2$. The ultrasonic energy forces the attainment of an intense mixing which promotes the reaction of the isoparaffin with the organic components contaminating the spent alkylation acid by increasing the mass transfer of the isoparaffin into the acid phase. The ultrasonic mixing reactor or reaction zone 109 may be installed in the spent acid line and sized to provide from about 10 seconds to about 10 minutes residence time for the spent acid-isoparaffin mixture in the ultrasonic field. Isobutane in line 108 may be injected as the isoparaffin into the spent acid stream prior to the regeneration reaction zone 109 shown schematically. Generally, from about 0.01 to about 1.0 pounds of isoparaffin are introduced per pound of spent acid.

The shape of the regeneration reaction zone may be cylindrical, spherical or simply a length of pipe with ultrasonic energy employed upon the periphery to intensely mix the contents. The effluent from the regeneration reaction zone is a tight emulsion which is returned to the alkylation reaction zone to facilitate separation of the alkylate product and excess isobutane from the acid phase. The regenerated acid becomes part of the acid inventory, part of which is continuously being rejected as spent acid as shown in the FIGURE by the acid purge 107. A portion of the spent acid is purged from the system prior to the isobutane injection, as previously mentioned, to prevent a buildup of water and non-alkylatable hydrocarbons in the system. Fresh acid is added to the alkylation system through line 102 to make up for the loss from the purge system.

It is expected that through the process of the present invention, the alkylation acid consumption can be reduced by up to 75 percent by volume, depending upon the process controls, and the alkylate yield can be increased up to 2.0 weight percent. This invention will allow an alkylation unit to economically operate at higher than normal acid concentrations where improved alkylate yield and quality can be realized.

The invention is particularly unique as the process, through use of ultrasonic energy, supplies the energy required to adequately emulsify the isoparaffin in the acid phase so that short reaction times may be utilized. Regeneration of spent alkylation acid with an isoparaffin outside the alkylation reactor, has not been heretofore utilized. Previous to the present invention, large volume reactors were required to give long reactor residence times to drive the reaction towards completion and improve alkylate yield while reducing acid consumption. Through the use of the process of the present invention, it is possible to reduce reactor size for a unit of given capacity.

By use of the process of the present invention, a dispersion more stable than most emulsions is obtained such that micron size hydrocarbon droplet particles having a very large surface area are provided in the acid phase for alkylation. Contaminants, which normally require the removal of the spent alkylation acid from the process stream, are converted into useful alkylate products for commercial use. Vibratory motion produced by the ultrasonic energy promotes mass transfer across the acid phase and thereby allows a regeneration of spent alkylation acid for its recycle to the alkylation unit and further use therein.

The present invention has been described herein with respect to particular embodiments thereof. It will be appreciated by those skilled in the art, however, that various changes and modifications may be made without departing from the scope of the invention.

We claim

1. A process for the regeneration of spent sulfuric acid alkylation catalyst containing organic contaminates which comprises intensly mixing said spent acid with an isoparaffin by means of ultrasonic energy so as to emulsify the isoparaffin in the spent acid and to covert the contaminating organic compounds to an alkylate and thereby regenerate the acid, wherein the ultrasonic energy is supplied at a frequency of from about 10 to 100 Kcps and the intensity of the ultrasonic energy is from 10 to about 800 w/in$^2$ where the contract time of the isoparaffin and the spent alkylation acid with the ultrasonic energy is from about 10 seconds to about 10 minutes.

2. The process of claim 1 further comprising:
   a. purging a portion of spent alkylation acid prior to the introduction of isoparaffin into the spent alkylation acid and the subjecting of the isoparaffin and spent alkylation acid to ultrasonic energy; and
   b. the addition of fresh alkylation acid to the regenerated alkylation acid.

* * * * *